No. 729,650.

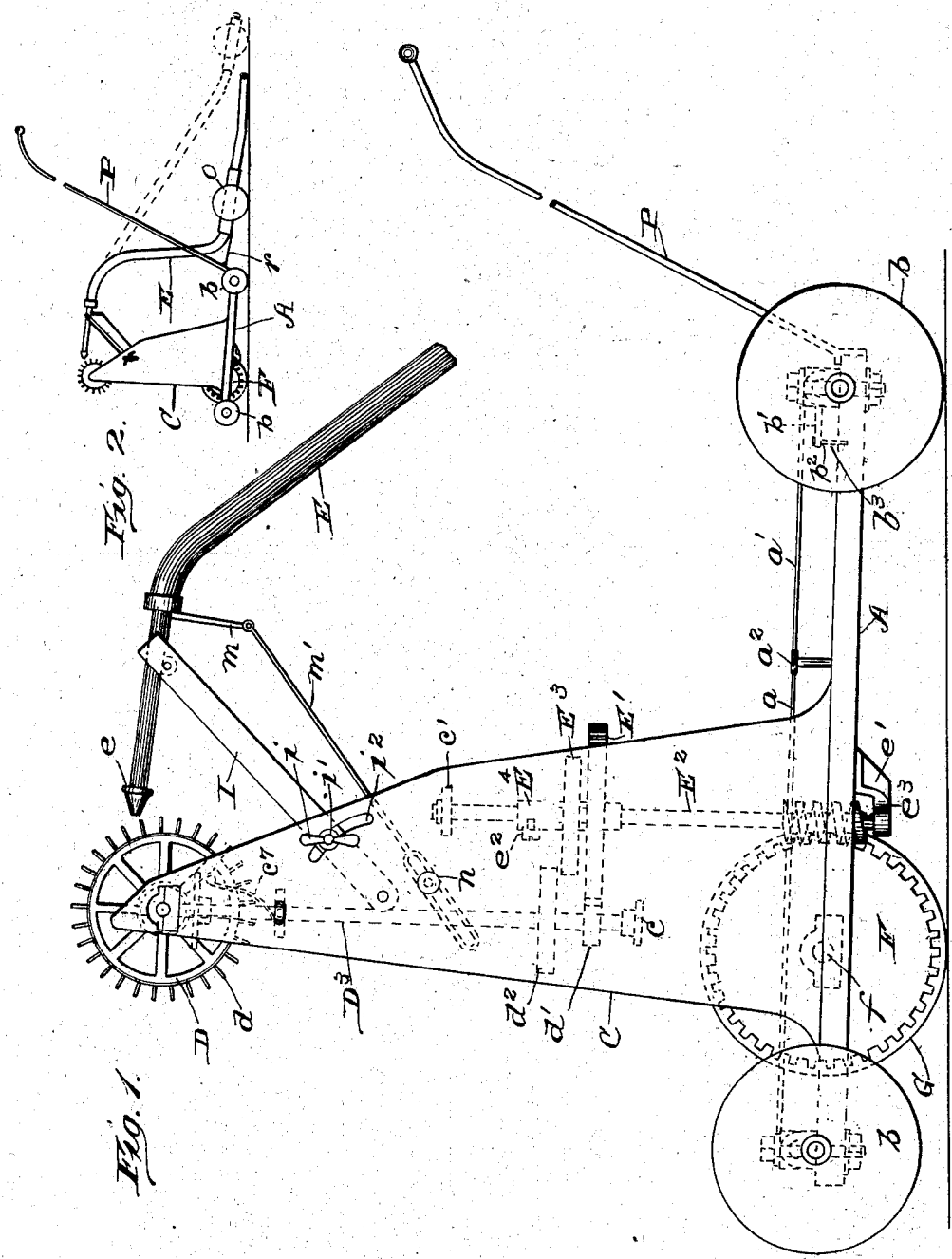

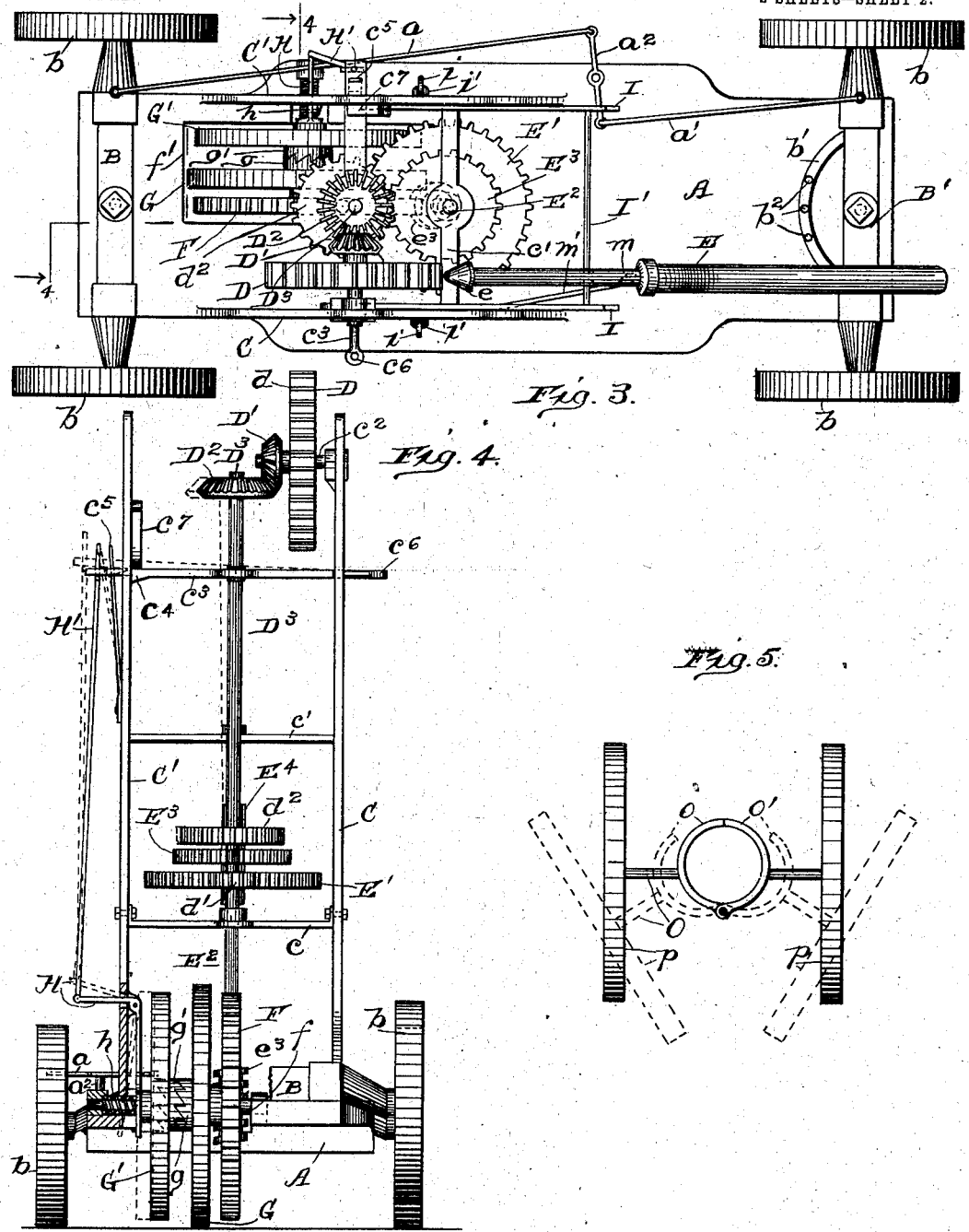

Patented June 2, 1903.

UNITED STATES PATENT OFFICE.

JACOB P. OLOFSSON, OF CHICAGO, ILLINOIS.

TRAVELING SPRINKLER.

SPECIFICATION forming part of Letters Patent No. 729,650, dated June 2, 1903.

Application filed July 3, 1902. Serial No. 114,231. (No model.)

*To all whom it may concern:*

Be it known that I, JACOB P. OLOFSSON, a citizen of the United States, residing at Chicago, in the county of Cook and State of Illinois, having invented certain new and useful Improvements in Traveling Sprinklers, of which the following is a specification.

This invention relates to improvements in an apparatus to be used for sprinkling or spraying lawns and the like; and it consists in certain peculiarities of the construction, novel arrangement, and operation of the various parts thereof, as will be hereinafter more fully set forth and specifically claimed.

The objects of my invention are, first, to provide a sprinkler or spraying apparatus of such a construction that it will be propelled or caused to travel by the force of the water discharged from a hose connected to a supply of water under pressure; second, to afford a sprinkler of the above-described character which will distribute the water as it travels along over a relatively large area on each side of the apparatus; third, to so construct the sprinkler that it may be caused to travel in a straight or curved path, and, fourth, to furnish means for automatically throwing the propelling mechanism out of gear when the sprinkler has traveled the length of the hose.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a view in side elevation of a sprinkler embodying my invention. Fig. 2 is a reduced view thereof, showing a trailer or carrier for the hose. Fig. 3 is a plan view of the sprinkler. Fig. 4 is an end view taken on line 4 4 of Fig. 3 looking in the direction indicated by the arrows and illustrating by dotted lines the position of the parts when they have been thrown out of gear. Fig. 5 is an end view of the trailer or carrier for the hose.

Similar letters refer to like parts throughout the different views of the drawings.

A represents the body or platform of the sprinkler, which carries the operating mechanism. Located at the front and rear ends of the platform A and pivotally secured thereto, usually on its upper surface, are axles B and B', which are provided with traction-wheels $b$ at their ends of the ordinary or any preferred construction. These axles are connected together by means of rods $a$ and $a'$ and a lever $a^2$, which is fulcrumed on the upper surface of the platform or body, as is clearly shown in Figs. 1 and 3 of the drawings. By thus connecting the axles B and B' it is apparent that by turning one of them on its pivot the other will be correspondingly moved and will thus cause the sprinkler to travel in a curved line.

The axle B' is provided with a curved bar $b'$, having a series of openings $b^2$ to receive a bolt $b^3$, which passes therethrough and into a suitable opening in the platform, thus securing said axle in the desired position.

Extending upwardly from the platform A and at the sides thereof are standards C and C', which are united together by means of cross-bars $c$ and $c'$, as is clearly shown in Fig. 4 of the drawings. Horizontally journaled on the upper portion of one of the standards is a shaft $c^2$, on which is mounted a water-wheel D, having blades or teeth $d$, against which the water will be discharged from the nozzle $e$ of the hose E, which is connected at one of its ends to a hydrant or other source of water-supply.

Mounted on the shaft $c^2$ is a beveled gear D', which meshes with a similar gear D$^2$ on the upper end of a shaft D$^3$, which is vertically journaled at its lower end in the cross-bar $c$ and passes through a shifting bar $c^3$, located in the upper portions of the uprights or standards. Mounted on the lower portion of the shaft D$^3$ is a pinion $d'$, which meshes with a gear E' on the upper portion of the shaft E$^2$, which is vertically journaled at its lower end in a bracket $e'$, secured to the lower surface of the platform. The upper end of the shaft E$^2$ is journaled in the cross-piece $c'$. (See Figs. 1 and 3 of the drawings.) The gear E', as well as the smaller gear E$^3$, is mounted on a sleeve E$^4$ on the shaft E$^2$, which sleeve is adjustably secured thereon by means of a set-screw $e^2$, passing through said sleeve. Mounted on the shaft D$^3$, just above the pinion $d'$, is a gear $d^2$, which is used to mesh with the gear E$^3$ when it is desired to change the speed of the shaft $E^2$, which may be done by sliding the sleeve $E^4$ upwardly thereon.

On the lower end of the shaft $E^2$ is a worm $e^3$, which meshes with a worm-gear F, mounted on a shaft $f$, transversely journaled in the platform, which is provided with an opening $f'$ for the operation of said gear and other parts. Mounted on the shaft $f$ is a propelling-wheel G, which is preferably fixed to the gear F and has on its hub a clutch-face $g$ to engage a clutch-face $g'$ on the hub of a wheel $G'$, which is loosely mounted on said shaft, and the clutch of which wheel is held in engagement with the clutch $g$ by means of a spring $h$ around its shaft and one end of a bell-crank lever H, which is fulcrumed on one of the uprights or standards. Connected to the shorter or upper arm of the bell-crank lever H is a rod $H'$, which passes through at its upper end a suitable opening in one end of the shift-bar $c^3$, which passes through openings in the uprights and has a shoulder $c^4$ to engage one of the uprights below its opening, so as to prevent said bar moving outwardly until it is raised by the rod $H'$, as is apparent.

Secured to one of the uprights is a spring $c^5$, which engages the outer end of the bar $c^3$ and tends to move said bar outwardly when it is lifted. The other end of the bar $c^3$ may be provided with an opening $c^6$, in which may be secured a cord by means of which it may be retracted. The bar $c^3$ is normally pressed downwardly by means of a spring $c^7$, secured to the inner surface of one of the uprights.

Pivotally secured to each of the uprights near its upper end is an arm I, which are adjustably secured in place by means of winged nuts $i$ on bolts $i'$, which pass through said arms and slots $i^2$ in the uprights. The outer ends of the arms I are connected by means of a tie-rod $I'$, on which is pivotally secured the nozzle $e$, to which the hose is connected. Near its end to which the hose is connected the nozzle $e$ is provided with an arm $m$, to which is pivotally secured one end of a rod $m'$, the other end of which is slotted and is adjustably secured to one of the uprights by means of a bolt and nut $n$, which bolt passes through said slot and into the upright. In order to properly support the hose and lessen the friction thereof as it is dragged along the ground, I employ a trailer M, which comprises two semicircular pieces $o$ and $o'$, hinged together at the lower portion of their ends, so that they may be opened to receive the hose therebetween. These pieces are mounted on an axle O, which has at its ends wheels $p$, thus forming a truck or carriage which may be connected by means of a rod $r$ or otherwise to one end of the platform A, as is shown in Fig. 2 of the drawings, or said carriage or trailer may be disconnected from the platform, when it will assume the position in the movement of the sprinkler shown by dotted lines in Fig. 2 of the drawings. This trailer is also useful in regulating the flow of water through the hose, for if it is connected to the platform, as shown by continuous lines in Fig. 2, it is apparent that the hose will thereby have a compound bend, thus retarding to some extent the flow of the water, whereas if the trailer is disconnected the hose will be almost straight, thus offering but little impediment to the water.

One end of the platform is preferably provided with a handle P, by means of which the device may be propelled when not used as a sprinkler.

The operation is as follows: The nozzle $e$ is adjusted by means of the arms I and rod $m'$, so that its discharge of water will strike the blades $d$ of the water-wheel D at the proper angle to cause the same to rotate, in which operation the water will be distributed on each side of said wheel. As the water-wheel rotates the shaft $D^3$ will be turned through the gears $D'$ and $D^2$ and its motion transmitted to the worm-shaft $E^2$ through the gears on said shafts. The worm $e^3$ meshing with the gear F will cause it, as well as the propelling-wheel G, which rests on the ground, to revolve, thus propelling the entire machine. When the machine has reached the limit of the length of the hose and is stopped thereby, the speed of the wheel G will be increased by reason of the force of the water discharged against the water-wheel, for it is apparent that while the machine is stationary the water will exert more force or power against the water-wheel than if the machine were moving in the direction of the discharge of water. As the wheel G is thus more rapidly driven it is evident that by reason of the inclination of the teeth of the clutches on the wheels G and $G'$ the latter will be caused to slide outwardly, so as to disengage the clutches $g$ and and $g'$, in which operation the lower member of the bell-crank lever H will be forced outwardly, thus raising the rod $H'$ and shift-bar $c^3$, so that the latter will be moved outwardly by means of the spring $c^5$, in which operation the shaft $D^3$, which passes through the shift-bar $c^3$, will be moved so as to disconnect its gear $D^2$ from the gear $D'$, as is clearly shown in Fig. 4 of the drawings. It will be understood that the tension of the spring $h$ is just sufficient to hold the clutches $g$ and $g'$ in engagement when the machine is traveling over the ground, yet will yield sufficiently to allow the wheel $G'$ to be moved outwardly when the machine is stopped, and greater speed is thereby given to the wheel G. To throw the parts into gear, the end of the shift-bar $c^3$ having the opening $c^6$ therein may be retracted, as is evident.

Having thus fully described my invention, what I claim as new, and desire to secure by Letters Patent, is—

1. The combination with the wheeled platform or frame, of an upright at each side thereof, a water-wheel journaled on the upper end of one of said uprights, a nozzle adjustably mounted on the uprights so as to discharge against said wheel, a flexible hose connecting the nozzle and a supply of water under pressure, a spring-actuated shifting-bar horizontally and movably located in the uprights, a shaft engaging the shifting-bar and vertically journaled and geared to the shaft of the water-wheel, a worm-shaft vertically journaled, gearing connecting the vertical shafts, a shaft transversely journaled on the platform, a worm-gear and a propelling-wheel mounted on the transverse shaft, a worm on the worm-shaft to engage the worm-gear, and means to throw the mechanism in and out of gear, substantially as described.

2. The combination with the wheeled platform, of an upright at each side thereof, a water-wheel journaled on the upper end of one of said uprights, a beveled gear on the shaft of said wheel, a nozzle adjustably mounted on the uprights so as to discharge against said wheel, a flexible hose connecting the nozzle and a supply of water under pressure, a spring-actuated shifting-bar horizontally and movably located in the uprights, a shaft vertically journaled and engaging the shifting-bar, a beveled gear on the upper end of said shaft, a worm-shaft vertically journaled, gearing connecting the vertical shafts, a shaft transversely journaled on the platform, a worm-gear and a propelling-wheel mounted on the transverse shaft, a worm on the worm-shaft to engage the worm-gear, a clutch-face on the propelling-wheel, a spring-pressed wheel loosely mounted on the transverse shaft provided with a clutch-face to engage the clutch-face of the propelling-wheel, a bell-crank lever fulcrumed on one of the uprights and having one of its ends located between the clutch-wheel and its spring, and a rod connecting the other end of said lever to the shifting-bar, substantially as described.

JACOB P. OLOFSSON.

Witnesses:
   CHAS. C. TILLMAN,
   A. GUSTAFSON.